F. H. RUECKING.
EXPANSION BOLT.
APPLICATION FILED AUG. 3, 1911.

1,013,222.

Patented Jan. 2, 1912.

Witnesses:
Lottie M. Fox.
Bertha von Behrens.

Inventor:
Frederick H. Ruecking,
By Hugh K. Wagner
His Attorney.

UNITED STATES PATENT OFFICE.

FREDERICK H. RUECKING, OF ST. LOUIS, MISSOURI.

EXPANSION-BOLT.

1,013,222.

Specification of Letters Patent.

Patented Jan. 2, 1912.

Application filed August 3, 1911. Serial No. 642,197.

*To all whom it may concern:*

Be it known that I, FREDERICK H. RUECKING, a citizen of the United States, residing at the city of St. Louis, State of Missouri, have invented certain new and useful Improvements in Expansion-Bolts, of which the following is a specification.

This invention relates to certain new and useful improvements in expansion bolts, and has for its primary object a bolt of this type which is particularly adapted for use in connection with metal work, especially to connect the boiler plate of a traction engine directly to the axle.

A further object of the invention is to provide a bolt capable of withstanding a maximum amount of vibration without jarring loose.

Figure 1:
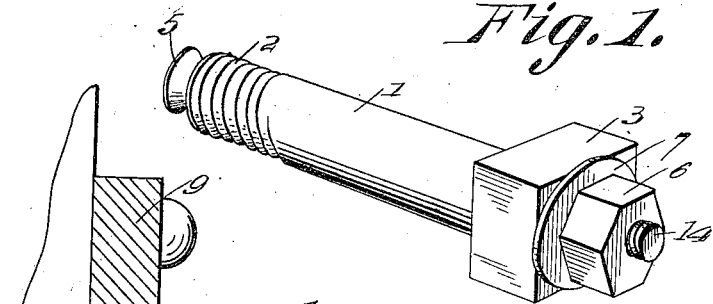

In the drawings: Figure 1 is a perspective view of the present invention, Fig. 2 is a view partly in section showing the bolt applied to a traction engine, and Fig. 3 is a central longitudinal sectional view of Fig. 1.

Referring to the drawings the numeral 1 designates a sleeve which is formed at one end with exterior screw threads 2 and at its other end with an integral polygonal head 3. The bolt proper is designated 4, and is provided at one end with exterior screw threads 14 and at its opposite end with a conical head 5, the latter being for engagement with a conical seat 15 which is formed in the threaded end 2 of the sleeve 1. The sleeve, it will be noted, is formed integral, and is devoid of any slits or the like which would tend to weaken the same, the wall which surrounds the conical seat 15 being a continuous unbroken one. The threaded end 14 of the bolt proper 4 has a nut 6 threaded thereon, and the inner face of the nut 6 bears against a washer 7 which latter abuts the outer face of the polygonal head 3 of the sleeve 1.

Figure 2:
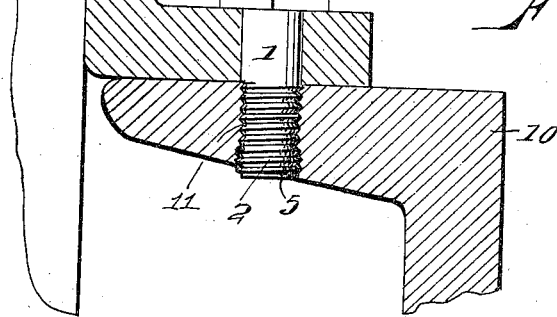
Figure 3:
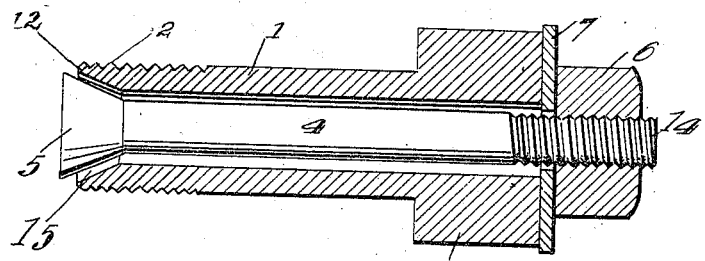

The invention is particularly adapted for use in bolting the boiler plate of a traction engine directly to the axle, and by referring to Fig. 2 of the drawings it will be seen that the boiler shown in fragment and designated 8 is provided with an angle iron bracket 9 which is riveted thereto, the angle iron 9 being provided with a hole through which the sleeve 1 is passed, and the threaded end 2 of the sleeve is passed through a threaded opening 11 in the axle frame 10.

The sleeve 2 is threaded into the threaded opening 11 by applying a wrench to the polygonal head 3 thereof, and, after the head has been driven to the limit of its inward movement, the nut 6 is then rotated to draw the conical head 5 of the bolt proper 4 into frictional contact with the conical seat 15 of the cylinder 1 which will effect expansion of the thin tapering wall 12 which is formed by the integral seat 15, which wall surrounds the seat 5' and is, as above stated, an unbroken continuous one. The wall 12 upon being moved outwardly by reason of the conical head 5 effecting a wedging action thereagainst, will cause the screw threads 2 at the extremity of the sleeve 1 to be wedged into engagement with the threads of the threaded opening 11 of the axle frame 10, and will effectually prevent disengagement of the sleeve 1 from the axle frame 10. By inspection of Fig. 2 of the drawings it will be seen that the screw threads 2 are right handed and the screw threads 14 are also right handed, so that when the nut 6 is turned to draw the conical head 5 to wedge the end 12 of the sleeve 1 into engagement with the threads of the theaded opening 11, any movement of the sleeve 1 which might result from a turning movement of the nut 6 will cause sleeve 1 to tighten and thus should the sleeve 1 for any reason not have been moved to its limit of tightening movement, rotation of the nut 6 will tend to tighten the sleeve in an obvious manner.

It is particularly to be noted that the present invention is designed especially for use in connection with metal work, and particularly with traction engines. Traction engines are subjected to a great amount of vibration, which results not only from the roughness of the ground over which the engine travels, but also due to the engine movements. When ordinary bolts are used or bolts other than the one forming the subject matter of this invention, the same jar loose and result in disabling the engine with the consequent disadvantages of labor necessitated to repair the engine, delay, and in laying up other laborers until the engine can be repaired.

The sleeve is of uniform diameter throughout and the thin wall or end, due to its slight thickness can be readily urged outwardly, and since the seat 15 flares outwardly an extremely thinned portion is formed at the extremity of the threaded end of the sleeve, which is easily forced outwardly by the head 5 of the bolt proper.

What is claimed is:

1. An expansion bolt of the type set forth, consisting of a sleeve of uniform diameter throughout formed with exterior threads at one end and with an integral wrench-engaging head at its opposite end, said sleeve being formed at its threaded end with an interior outwardly flaring conical seat the wall of which is thinned at its free end and is continuous and unbroken throughout, a bolt proper having a conical head at one end which engages said conical seat of the sleeve, said bolt proper being arranged in said sleeve and having its other end threaded and projecting beyond said head of the sleeve, and a nut on said threaded end of the bolt proper to bear against the head of the sleeve and to draw said head into wedging engagement with said wall to move the latter outwardly.

2. An expansion bolt of the type set forth, including a sleeve having a conical interior seat at one end forming a thin continuous unbroken wall that surrounds the seat, said wall being exteriorly threaded and adapted to be received in a threaded opening of an article, and a bolt proper in the sleeve having a head at one end to engage in said seat of the sleeve and means at its opposite end to wedge said bolt head into engagement with said seat to thereby expand said thin continuous wall which surrounds the seat to cause the threads of said wall to become wedged into engagement with the threads of said threaded opening of the article.

In testimony whereof I hereunto affix my signature in the presence of two witnesses.

FREDERICK H. RUECKING.

Witnesses:
GEORGE G. ANDERSON,
BERTHA VON BEHRENS.